US011685510B2

(12) United States Patent
Giang et al.

(10) Patent No.: US 11,685,510 B2
(45) Date of Patent: Jun. 27, 2023

(54) WING DEPLOYMENT MECHANISM AND DESIGN METHOD USING PNEUMATIC TECHNIQUE

(71) Applicant: VIETTEL GROUP, Ha Noi (VN)

(72) Inventors: Thanh Ha Giang, Lang Son Province (VN); Hai Quan Do, Ha Noi (VN); Thi Nhu Trang Nguyen, Ha Noi (VN); Huy Nguyen, Ha Noi (VN); Tien Dat Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 758 days.

(21) Appl. No.: 16/670,173

(22) Filed: Oct. 31, 2019

(65) Prior Publication Data

US 2020/0140060 A1 May 7, 2020

(30) Foreign Application Priority Data

Nov. 1, 2018 (VN) .............................. 1-2018-04904

(51) Int. Cl.
  *B64C 3/38* (2006.01)
(52) U.S. Cl.
  CPC ..................................... *B64C 3/38* (2013.01)
(58) Field of Classification Search
  CPC .................................... B64C 3/56; B64C 3/38
  USPC .......................................................... 244/39
  See application file for complete search history.

(56) References Cited

U.S. PATENT DOCUMENTS

| 1,485,163 | A | | 2/1924 | Braun | |
| 4,336,914 | A | * | 6/1982 | Thomson | F42B 10/20 244/46 |
| 6,170,779 | B1 | * | 1/2001 | Nyhus | B64C 27/50 244/17.11 |
| 6,923,404 | B1 | * | 8/2005 | Liu | B64C 39/028 244/46 |
| 8,292,216 | B1 | * | 10/2012 | Rumberger, Jr. | ... B64C 29/0091 244/49 |
| 8,444,082 | B1 | * | 5/2013 | Foch | B64C 3/56 244/49 |
| 9,079,663 | B2 | * | 7/2015 | Sommer | B64C 3/40 |
| 9,452,820 | B1 | * | 9/2016 | Wirth | B64C 39/024 |
| 10,458,764 | B2 | * | 10/2019 | Willenbring | F42B 10/14 |
| 10,583,910 | B2 | * | 3/2020 | Tao | B64C 5/12 |
| 10,953,976 | B2 | * | 3/2021 | Tao | B64C 3/44 |

(Continued)

FOREIGN PATENT DOCUMENTS

| CA | 2825073 A1 * | 4/2014 | ........... B64C 23/072 |
| CN | 107380402 A * | 11/2017 | ............... B64C 3/56 |

(Continued)

*Primary Examiner* — Christopher P Ellis
(74) *Attorney, Agent, or Firm* — PATENTTM.US

(57) ABSTRACT

A wing deployment mechanism and a design method using a pneumatic cylinder with transmission spring system (assembly) are provided. The deployment mechanism comprises frame, wing, deployment cylinder, gas canister, rotation shaft, bolts, groove, locking pin, dowel pin, flange, first spring, second spring, dowel pin hole, looking pin hole, slider, third spring. The design method includes step 1: determining the problem's specifications; step 2: constructing the equations of motion; step 3: designing a primary scheme for a system of pneumatic cylinder with transmission spring. Step 4: determining the parameters for the system; and step 5: validating the design.

9 Claims, 5 Drawing Sheets

(56) References Cited

U.S. PATENT DOCUMENTS

| | | | | |
|---|---|---|---|---|
| 11,319,087 B2* | 5/2022 | Miralles | ............. | F41F 3/042 |
| 2004/0159227 A1* | 8/2004 | Richards | ............ | F42B 10/14 |
| | | | | 89/1.4 |
| 2012/0018572 A1* | 1/2012 | Shai | .............. | F42B 10/64 |
| | | | | 244/39 |
| 2018/0312251 A1* | 11/2018 | Petrov | ............. | B64D 27/12 |
| 2018/0312252 A1* | 11/2018 | Yates | ............... | B64C 1/26 |
| 2019/0031316 A1* | 1/2019 | Hefner | ............ | B64C 3/56 |
| 2020/0140060 A1* | 5/2020 | Giang | .............. | B64C 39/024 |
| 2021/0129985 A1* | 5/2021 | Regev | .............. | B64C 39/024 |

FOREIGN PATENT DOCUMENTS

| | | | | |
|---|---|---|---|---|
| CN | 107741180 A * | 2/2018 | | |
| CN | 110104160 A * | 8/2019 | ............. | B64C 1/30 |
| CN | 112193404 A * | 1/2021 | | |
| CN | 112977801 A * | 6/2021 | ............. | B64C 3/56 |
| CN | 114212238 A * | 3/2022 | | |
| EP | 000002083238 B1 | 1/2014 | | |
| KR | 20120037806 A * | 1/2017 | | |
| KR | 20120037806 A * | 2/2017 | | |
| WO | WO-2019183402 A1 * | 9/2019 | ............. | B64C 3/56 |
| WO | WO-2019213102 A1 * | 11/2019 | ............. | B64C 1/26 |

\* cited by examiner

WING DEPLOYMENT MECHANISM AND DESIGN METHOD USING PNEUMATIC TECHNIQUE

FIELD OF THE INVENTION

The invention is directed to a wing deployment mechanism and a design method using pneumatic technique for unmanned aerial vehicles under aerodynamic loading conditions. More particularly, these inventions are implemented in the design of compact unmanned aerial vehicle (UAV) under limited wing deployment time.

BACKGROUND DESCRIPTION

For aerial vehicles such as missiles, air planes and other similar vehicles, the wing system plays a very important role. Beside adding lift, the wing system also helps reduce the drag forces during operation and slows down the vehicle when landing. For aerial vehicles to operate as designed, the wing deployment should have high reliability in keeping the wing precisely at the designed position for each phase, including storage, transportation and operation. Also, the deployment mechanism must be strong enough to withstand the load encountered during these phases.

In many of the aerial vehicles, the wings are always in the open state, therefore, a deployment mechanism is not required. While having the advantage of simplicity, one of its main drawbacks is that the wingspan factor usually makes it difficult to store, transfer or deploy in the battlefield due to the high space requirements. Wing deployment mechanisms are needed when the compactness is important. For example, missiles launching from launchers and stored inside the storage boxes are designed so that the wings can be easily folded into a compact configuration, then quickly deployed into a flight ready configuration after launching or after reaching a prescribed velocity.

There are several wing deployment mechanisms that have been published. For example, the invention EP2083238 B1 "Foldable wing with unfolding device" proposes a deploying method using a torsional device to connect the wing to the body of the vehicle and using a pulley and a cable to open the wing.

Invention U.S. Pat. No. 1,485,163A proposes a deploying method with wings that can be folded similar to the wings of birds. The main framework of the wings is made in two parts. The first part is pivotally connected to the body through the hinges along the body in such a way that it can be folded downwardly against the body. The second part of the wing is pivotally connected to the first part through a number of cylindrical pins perpendicular to the cross sections of the wings. However, the simple hinge mechanism to connect the wing to the body is not applicable to modern aerial vehicles with high speed. Moreover, the fact that the folding wings are not aligned with the shape of the body is another downside of this method.

The main drawbacks of the above deployment mechanisms is that they are not applicable to aerial vehicles that require very short time to deploy or undergo high aerodynamic load which makes it difficult for material and structural designs.

Thus, this invention proposes a deploying mechanism using compressed air and a damping spring system for aerial vehicles with high aerodynamic loads and short deployment time.

TECHNICAL BACKGROUND OF THE INVENTION

The first purpose of the invention is to propose a deploying mechanism for large aerial vehicles that is capable of keeping the wings at the right position in different working conditions including high aerodynamic load. Also, this mechanism could diminish the disadvantages related to storage and operating matters.

While the wing deployment structure can be made of common materials, e.g. C45 or 40Cr steel, heat treatment is required to improve the mechanical properties of the material. However, the heat treatment needs to maintain the toughness of the materials. Therefore, it is critical to take into account the following factors: material properties, heat treatment conditions, and the design loads, including the aerodynamic loads, the functioning loads, and the impact load due to the deployment process.

The deploying mechanism in this invention should be easily applicable in different aerospace industries for various types of aerial vehicles, such as UAV or missiles. The flexibility here is that the size of the deployment mechanism can be adjusted to properly suit each type of the airborne bodies.

The proposed wing deployment mechanism comprises of a main frame 1, wing 2, cylinder 3, gas canister 4, rotation shaft 5, bolts 6, groove 7, locking pin 8, dowel pin 9, flange 10, first spring 11, second spring 12, dowel pin hole 13, locking pin hole 14, slider 15, third spring 16. The main roles of a wing deployment mechanism are to attach the wings system to an aircraft frame, to deploy the wing at the appropriate time, and to sustain load received from the wing.

The second purpose of the invention is to propose a design method using pneumatic cylinder and transmission springs to deploy wings for aerial vehicles under high aerodynamic load and with short time requirement for wing deployment. The design procedure includes five steps: 1. Determine the technical requirements of the problem; 2. Formulate the equations of motion: 3. Define a primary scheme of the pneumatic cylinder and spring system; 4. Determine the design parameters for pneumatic cylinder and transmission spring system; 5. Validate the design.

BRIEF DESCRIPTION OF THE DRAWINGS

Illustrations of the invention are described with reference to figures attached hereto Identical structures, elements or parts that appear in more than one figure are generally labeled with the same numeral in all the figures in which they appear. Dimensions of components and features shown in the figures are not necessarily shown to scale.

DETAILED DESCRIPTION OF THE INVENTION

The invention is described in the detailed description by the references made to the schematic drawings. However, to any person with average knowledge in the invention field, the understanding of these references is not limited by what illustrated in the above drawings. The design of this invention could also be innovated and/or modified but committed to stay in the boundary conditioned by the safety specifications. Therefore, the embodiments of the invention described with reference to figures are only served as illustrative purpose, and do not set any limitation for the invention.

Figure 1:
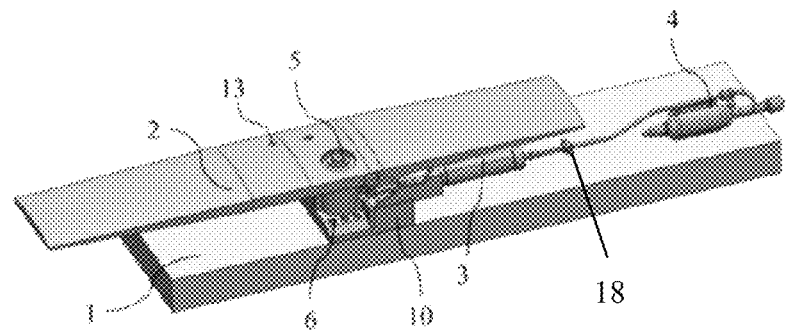
FIG. 1 constitutes schematic drawing of an airborne body in an inactive state (folded state).
Figure 2:
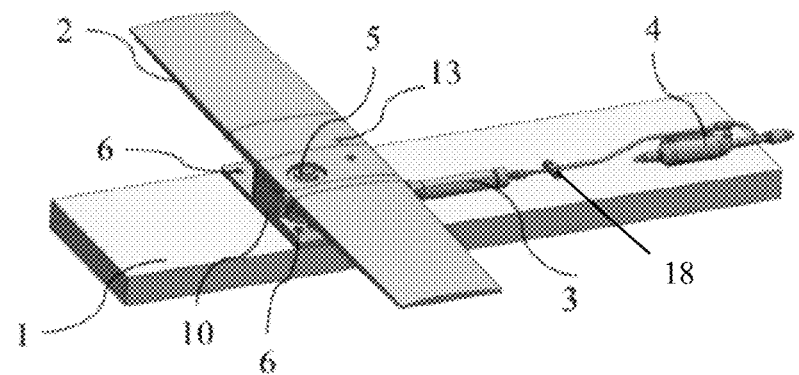
FIG. 2 constitutes schematic drawing of the airborne body in an active state (deployed state).
Figure 3:
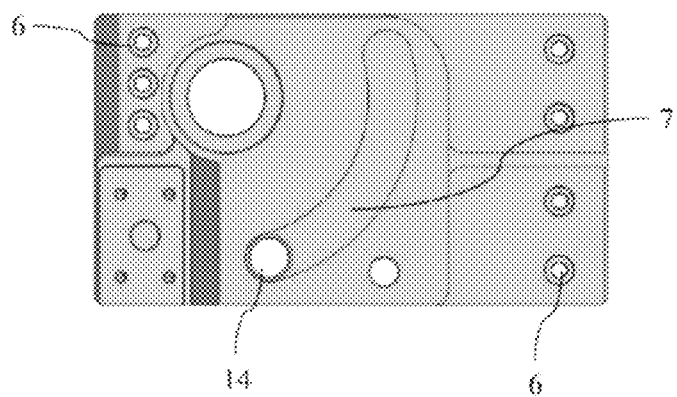
FIG. 3 constitutes schematic drawing of the flange.
Figure 4:
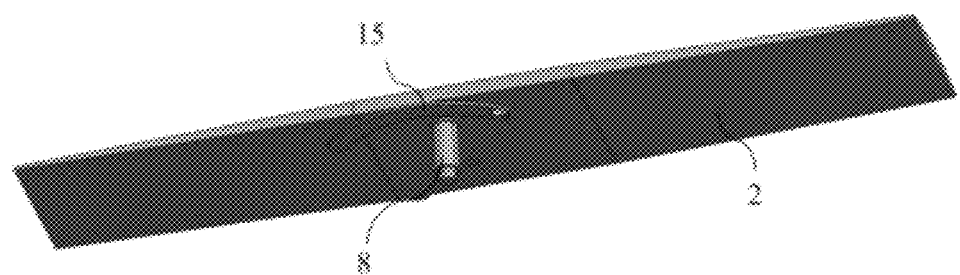
FIG. 4 constitutes the drawing that describes the positions of locking pin and the slider.
Figure 5:
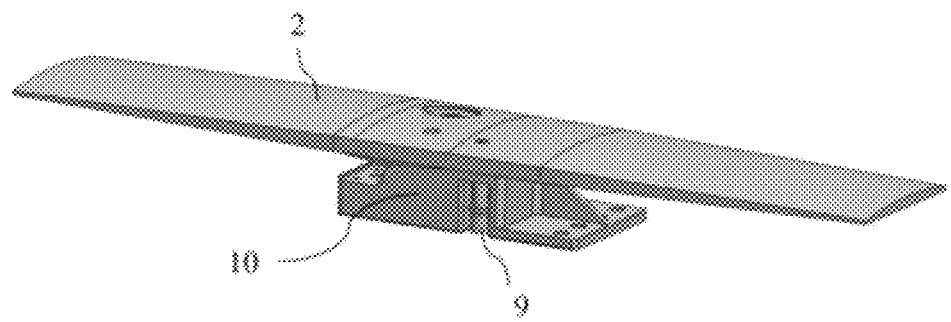
FIG. 5 constitutes the drawing that describes the positions of dowel pin.
Figure 6:
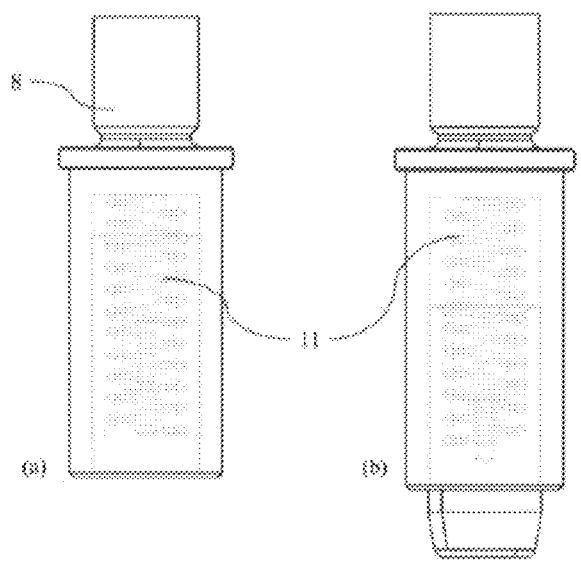
FIG. 6 constitutes the locking pin mechanism.
Figure 7:
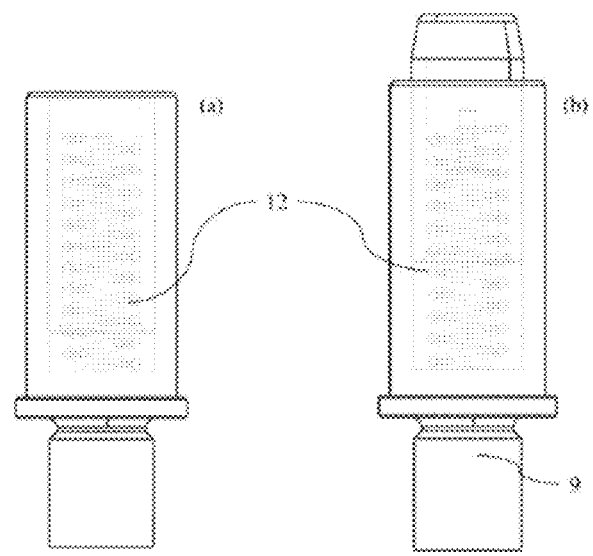
FIG. 7 constitutes the dowel pin mechanism.

The first purpose of the invention is to propose a wing deployment mechanism rotating the wings system from an inactive state position to an active state position. This reference is made to FIGS. 1 and 2. The proposed wing deployment mechanism comprises of main frame 1, wing 2, cylinder 3, gas canister 4, rotation shaft 5, bolts 6, groove 7, locking pin 8, dowel pin 9, flange 10, first spring 11, second spring 12, dowel pin hole 13, locking pin hole 14, slider 15, third spring 16.

Figure 9:
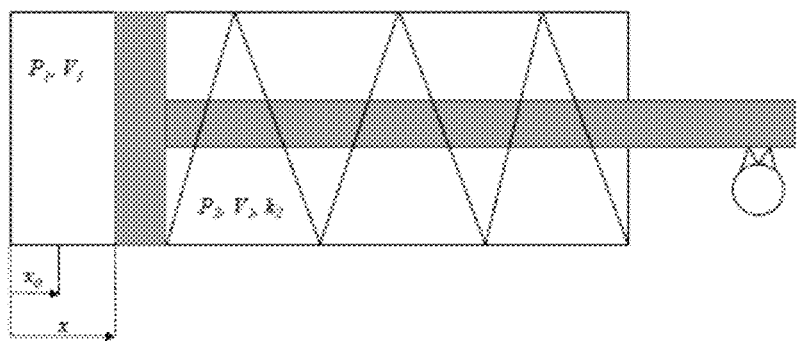
FIG. 9 constitutes the schematic drawing of the pneumatic cylinder with spring return system.

More specifically, the main frame 1 is made of materials such as aluminum, steel or composite. The frame 1 and wing 2 is designed to meet the aerodynamic and strength requirements. The deployment cylinder 3 provides a pneumatic means for creating an angular momentum, hence rotating the wing 2. The deployment cylinder 3 and the gas canister 4, mounted on the outer of frame 1 are connected by a system of pipelines. The flow of gas inside the pipes is controlled by a pyrotechnic valve 18 positioned in the middle of the pipeline system. The deployment cylinder 3 comprises a pneumatic piston and a third spring 16 which are schematically shown in FIG. 9.

Any professional would understand that the deployment of the wing 2 is executed in a rotational movement around the rotation shaft 5 due to the pressure from the gas canister 4.

The whole wing deployment mechanism is mounted on the outer frame and fixed with the help of the bolts 6. More specifically, the bolts 6 connect the flange 10 to the frame 1.

The groove 7 on the surface of the flange 10 keeps the locking pin 8 at loading state.

In the embodiments, the locking pin 8, with one end screwed into wing 2, is the main component to withstand any collision during the rotational movement of the wing. When wing 2 reaches its active state position, the rotation stops and the locking pin 8 snaps into to the locking pin hole 14. This action is established due to the compression force of the first spring 11. Recommended materials for the locking pin 8 are C45 or 40Cr steel with hardness scale ranging from 42 to 44 HRC.

The dowel pin 9 is connected to the deployment cylinder. When wing 2 reaches its active state position, the force of the second spring 12 allows the dowel pin 9 to snap into the dowel pin hole 13. The function of the dowel pin 9 is to stabilize the wing 2 in its active state. Similar to the locking pin 8, the dowel pin 9 can be made of C45 or 40Cr steel, with harness scale ranging from 40 to 42 HRC.

Also in the embodiments, the flange 10 is mounted on the frame 1 by bolts 6. The flange 10 is then become a base for the wing 2 to be mounted on.

The first spring 11$i$ and the second spring 12 have an identical purpose of propelling the spring assembly in the locking pin 8 and the dowel pin 9 so they can respectively snap into the locking pin hole 14 and the dowel pin hole 13 when the wing 2 rotates to the active state position.

Slider 15 keeps the locking pin 8 at the compressed condition during the inactive state.

As further shown in FIG. 9, the third spring 16 pushes the pneumatic piston again its movement, thus, slows down the rotational movement of the wing 2 when it is close to the active state position. It also decreases the collision force acing on the locking pin 8 during the impact.

The deployment mechanism can be described chronologically as followed: When an airborne body is launched from a launcher, the mechanism can be initiated instantly or timely, depending on the design of the system. When the wing 2 rotates to the active state position, the loaded springs instantly propels the dowel pin and locking pin to the dowel pin hole and locking pin hole, respectively. The mechanism is designed in such a way that the produced rotating force is larger than the aerodynamic drag under the most severe design, condition. Also, the mechanism must be strong enough to withstand the collision when the wing 2 is deployed.

At the first moment of its operation, gas from the gas canister 4 starts flowing into the deployment cylinder 3's chamber through the system of pipelines and controlled by means of the pyrotechnic valve. By filling the chamber, the gas provides a pressure which propels the pneumatic piston to move a distance $x(t)$, thus, compresses the air and the spring at the other side of the piston. The motion of the piston creates the rotation movement of the wing 2, while at the same time compresses the third spring 16. When the wing reaches its active state position, forces from the first spring 11 and the second spring 12 propel the locking pin 8 and the dowel pin 9 to their working positions on the wing 2 and the flange 10. The design specifications for these pins ensure that they can withstand large aerodynamic and impact loads.

The second purpose of the invention is to propose a design method of a deploying mechanism using a pneumatic cylinder with spring return assembly.

Figure 8:
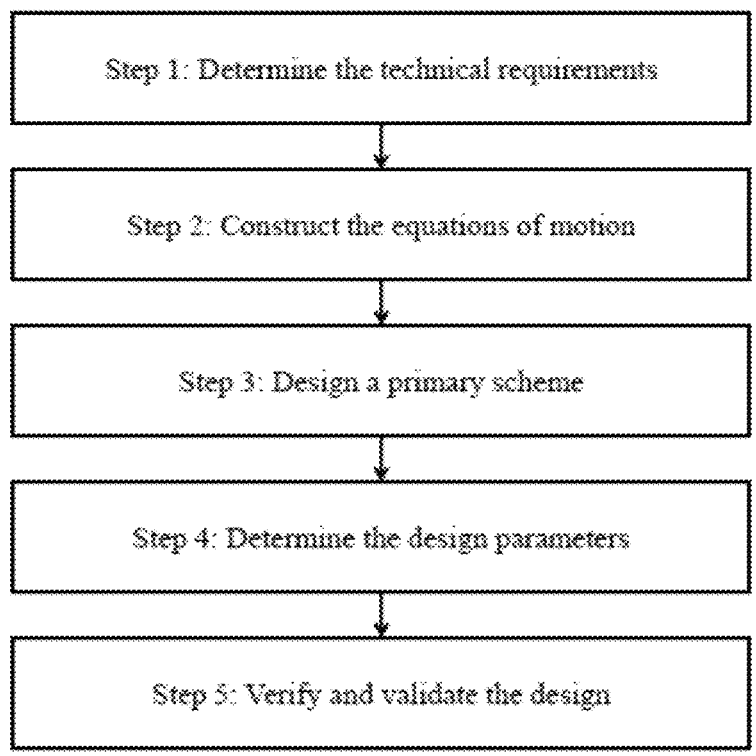
FIG. 8 constitutes the design procedure for the pneumatic cylinder with spring return system.

FIG. 8 shows the optimal steps of the proposed design method. These steps are; Step 1—Determine the technical requirements of the problem; Step 2—Formulate the equations of motion; Step 3—Define a primary scheme of the pneumatic cylinder and spring system; Step 4—Determine the parameters for the system; Step 5—Validate the design.

In step 1, the specifications can be determined as the conditions to initiate and finalize the deployment mechanism. These conditions vary due to the changes in the angle of attack, the angle of slide, etc. Any professional would understand that the smaller the aerodynamic load, the higher the deploying velocity and vice versa. Thus, the pneumatic cylinder with a spring system assembly must provide enough force to rotate the wing from $0°$ to $90°$ under the highest aerodynamic load and within a prescribed time. In the case of smallest aerodynamic load, corresponding to the highest deploying velocity, the impact between the wing and the wing deployment mechanism is severe. Thus, the role of the third spring in such situation is to lower the velocity by its tension force.

In step 2, the system of equations of motion is constructed based on the working principle of the pneumatic cylinder with transmission spring system. A schematic of the pneumatic cylinder with transmission spring is shown in FIG. 9.

The gas released by the gas canister fills the cylinder chamber and creates a pressure on the piston. Under this influence, the pneumatic piston takes a displacement $x(t)$, and this motion also compresses the third spring. Assuming that the gas expansion is adiabatic, the left and right chamber pressure can be derived as:

$$P_1 = P_0\left(1 + \frac{xA_1 + V_i}{V_0}\right)^{-\gamma}$$

$$P_2 = P_2(0)\left(1 - \frac{xA_2}{V_{20}}\right)^{-\gamma}$$

where $\gamma = \frac{7}{5}$ and $\rho = 0.87 \times 10^3$ kg/m³ for air.

More specifically, after the gas is allowed to travel through the pipelines system by means of the pyrotechnic valve, it flows from the air canister of the state $(P_0, V_0)$ and expands in the cylinder's right chamber at the state $(P_1(t), V_1(t))$, causing a pressure to propel the piston to move a distance $x(t)$. After the displacement of the piston, the right chamber is at state $(P_2(t), V_2(t))$. The displacement $x(t)$, transmitted to a gear of radius R, causes the wing to rotate an angle of θ(t). The equations of motion are derived as $m\ddot{x} = A_1 P_1 - A_2 P_2 - k_2 x - F - \mu \dot{x}$ $I_0 \dot{\theta} = F \times R - M_{kd}(\theta)$ where $k_2$ is the spring constant of spring 2 and μ is the friction constant.

The relation between the displacement of the piston and the rotating angle can be written as $x - x(0) = R \times \theta$ In step 3, the 3D mechanical model of the pneumatic cylinder with transmission spring system is designed using a 3D mechanical design software. The model must satisfy the spatial requirement, and at the same time it must be installed and replaced with minimum effort when needed.

In step 4, a loop is required for determining the design parameters of the problem. At the end of step 3, the initial parameters of the system, including mass, inertial moment, and the radius of transmission, are estimated. By solving the equations of motion of the system achieved in step 2 with initial parameters from step 3, the solutions are the deployment time and deployment velocity as a function of time. The input parameters are the initial pressure and volume of the air canister, the dimensions of the cylinder, the spring constants and the diameter of the piston. These parameters and their notations are listed in Table 1.

TABLE I

| Design parameters | |
|---|---|
| Parameter | Notation |
| Pressure of the gas canister | $P_0$ |
| Volume of the gas canister | $V_0$ |
| Volume of the cylinder | $V_i$ |

TABLE I-continued

| Design parameters | |
|---|---|
| Parameter | Notation |
| Diameter of the piston | $d_1$ |
| Diameter of the push rod | $d_3$ |
| Spring constant | $k_2$ |
| Piston length | $L_{xt1}$ |
| Initial position of piston | $x_0$ |
| Gear radius | $R$ |
| Piston mass | $m$ |
| Aerodynamic angular momentum | $M_{kd}$ |
| Moment of inertial of the wing | $I_0$ |

Figure 10:
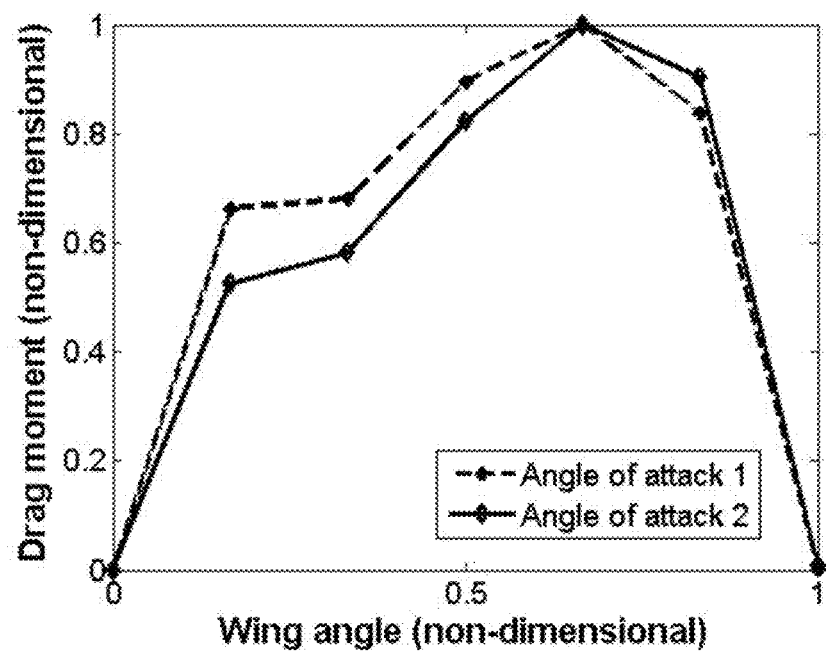
FIG. 10 constitutes the aerodynamic moment on the rotational shaft.
Figure 11:
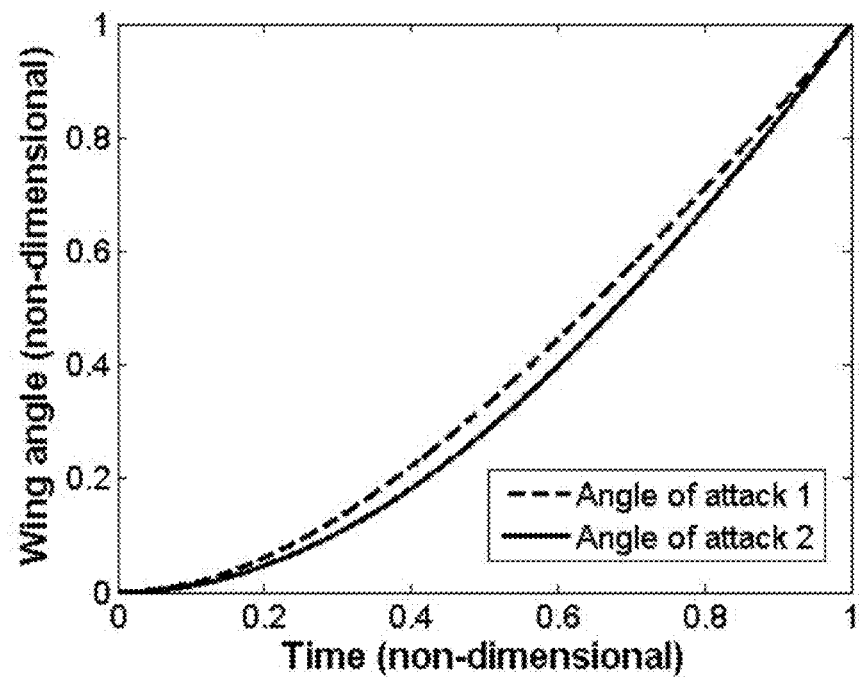
FIG. 11 constitutes the time of wing deployment at each opening angle.

FIGS. 10 and 11 show an example of the solutions of the equations of motion.

In step 5, validating the design achieved in step 4 by redesigning a 3D mechanical model using the obtained parameters. The 3D model is then imported into a finite element analysis software to simulate and validate the design.

Impact of the Invention

FIG. 9 shows an example solution from solving the equations of motion of pneumatic cylinder with spring return system for an airborne body that requires deployment time of less than one second and the aerodynamic loads as in FIG. 10. The result clearly confirms that both set of input parameter meet the design requirements.

The detailed 3D wing deployment mechanism is then designed based on the airframe shape and imported into a finite element analysis software for validating the strength requirements and optimization.

The design of a wing deployment mechanism that is required to function under various loading conditions and to complete the deployment under one second is achieved.

The proposed design method for wing deployment mechanism allows flexibility in altering input parameters, hence it is compatible for a wide range of airborne bodies and working conditions, even in the most severe situations. In the assembly, the spring, the pneumatic cylinder, and other components are common mechanical parts. They are available in a wide range of sizes and specifications and they do not require any special manufacturing processes. The application of the invention is subsequently capable of implementing to many other fields.

The pneumatic cylinder with spring system works with high precision and is easy to control the load and response time of the system. Thus, it is easy to adjust the deployment angle and deployment velocity. The mechanism and working principle are clear, and the mechanism can be assembled without much effort.

The invention claimed is:

1. A mechanism for deploying a wing from an airborne body, wherein the mechanism comprises: a frame made of materials designed to meet aerodynamic and material strength requirements;
   a deployment cylinder mounted to said frame, the deployment cylinder provides a pneumatic means for creating an angular momentum, hence rotates the wing, wherein the deployment cylinder comprises a pneumatic piston and a first spring wrapped around a push rod;

a gas canister mounted to said frame, wherein the gas canister releases gas into a chamber of the deployment cylinder, causing a pressure to propel the pneumatic piston;

a pipeline connecting the gas canister to the deployment cylinder;

a pyrotechnic valve positioned in the pipeline between the gas canister and the deployment cylinder;

a rotation shaft about which the wing is rotated from an inactive state position to an active state position, said rotation shaft being mounted to the frame;

a locking pin for locking the wing in an active state;

a flange mounted on the frame for supporting the wing for rotation about the rotation shaft, and comprising a groove that keeps the locking pin at a compression condition during the inactive state; and the flange comprising a locking pin hole for receiving said locking pin when the wing is in an active state, wherein at the moment that the wing reaches its active state position, the rotation will be stopped when the locking pin snaps into to the locking pin hole, wherein actuation of said piston causes rotation of the flange about the rotation shaft.

2. The mechanism for deploying a wing from an airborne body according to claim 1, wherein the frame material is selected from the group consisting of aluminum, steel or composite.

3. The mechanism for deploying a wing from an airborne body according to claim 1, further comprising plural bolts joining the flange to the frame.

4. The mechanism for deploying a wing from an airborne body according to claim 1 wherein the materials for making the locking pin are selected from C45 or 40Cr steel, which have the hardness from 42 to 44 HRC.

5. The mechanism for deploying a wing from an airborne body according to claim 1, further comprising a dowel pin that stabilizes the wing when it is in active state, wherein the dowel pin is made of material selected from C45 or 40 Cr steel, which have the harness from 40 to 42 HRC.

6. The mechanism for deploying a wing from an airborne body according to claim 1 wherein the flange is mounted on the frame using locking nuts.

7. The mechanism for deploying a wing from an airborne body according to claim 1 wherein a second spring propels a spring assembly in the locking pin so that it can snap into the locking pin hole when the wing rotates to the active state position.

8. The mechanism for deploying a wing from an airborne body according to claim 5 further comprising a third spring that propels a spring assembly in the dowel pin so that it can snap into a dowel pin hole when the wing rotates to the active state position, wherein the dowel pin hole is bored on the wing so that the dowel pin can snap into the dowel pin hole when the wing rotates to the active state position.

9. The mechanism for deploying a wing from an airborne body according to claim 1, wherein the first spring propels the pneumatic piston against its movement, thus, slowing down the rotational movement of the wing when it is close to an active state position.

\* \* \* \* \*